(12) United States Patent
Denton et al.

(10) Patent No.: US 8,096,741 B2
(45) Date of Patent: Jan. 17, 2012

(54) INTERIOR VEHICLE BODY STRUCTURE

(75) Inventors: Brenna Denton, Farmington, MI (US); Tomohito Hashikawa, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 12/947,493

(22) Filed: Nov. 16, 2010

(65) Prior Publication Data

US 2011/0057468 A1 Mar. 10, 2011

Related U.S. Application Data

(62) Division of application No. 12/169,237, filed on Jul. 8, 2008.

(51) Int. Cl.
*B60P 7/06* (2006.01)
*B60P 7/08* (2006.01)
*B60R 7/02* (2006.01)

(52) U.S. Cl. ........ 410/104; 410/105; 410/110; 296/24.3

(58) Field of Classification Search ................. 296/24.3, 296/65.16, 37.16, 24.44; 224/547; 410/105, 410/104, 108, 110; *B60P 7/06, 7/08, 7/02*
See application file for complete search history.

(56) References Cited

U.S. PATENT DOCUMENTS

| | | | |
|---|---|---|---|
| 3,713,616 A * | 1/1973 | Bowers | 410/105 |
| 4,248,558 A | 2/1981 | Lechner | |
| 4,955,771 A | 9/1990 | Bott | |
| 5,533,848 A | 7/1996 | Davis | |
| 5,823,724 A | 10/1998 | Lee | |
| 5,915,777 A * | 6/1999 | Gignac et al. | 296/37.16 |
| 5,960,967 A * | 10/1999 | Neil | 211/94.01 |
| 6,270,137 B1 | 8/2001 | Minix et al. | |
| 6,585,465 B1 | 7/2003 | Hammond et al. | |
| 6,846,140 B2 | 1/2005 | Anderson et al. | |
| 6,908,137 B2 | 6/2005 | Doxey et al. | |
| 6,921,119 B2 * | 7/2005 | Haspel et al. | 296/24.4 |
| 6,981,730 B2 * | 1/2006 | Bixby | 296/37.15 |
| 7,070,374 B2 | 7/2006 | Womack et al. | |
| 7,234,619 B2 | 6/2007 | Hicks et al. | |
| 7,401,995 B2 | 7/2008 | Senakiewich, II | |
| 2005/0117991 A1 | 6/2005 | Anderson et al. | |
| 2006/0222455 A1 | 10/2006 | Senakiewich, II | |
| 2007/0252404 A1 | 11/2007 | Muck et al. | |

FOREIGN PATENT DOCUMENTS

WO WO-2004/094194 A1 11/2004

* cited by examiner

*Primary Examiner* — Glenn Dayoan
*Assistant Examiner* — Sunsurraye Westbrook
(74) *Attorney, Agent, or Firm* — Global IP Counselors, LLP

(57) ABSTRACT

A vehicle body structure includes a vehicle interior cargo area having an interior wall, a track and a cargo accessory. The track is fixedly attached to the interior wall and the track includes a pair of parallel spaced apart wall portions defining a track slot therebetween. The cargo accessory includes a cargo supporting portion and an attachment portion. The attachment portion is configured and arranged to attach to the wall portions of the track retaining the cargo accessory in position with a snap-fit engagement arrangement.

19 Claims, 11 Drawing Sheets

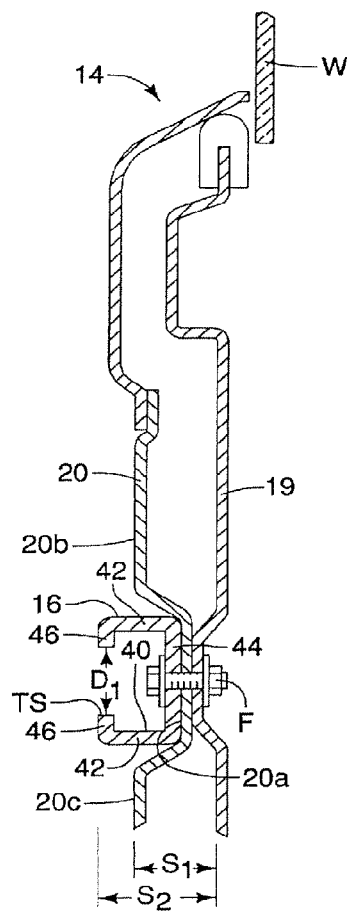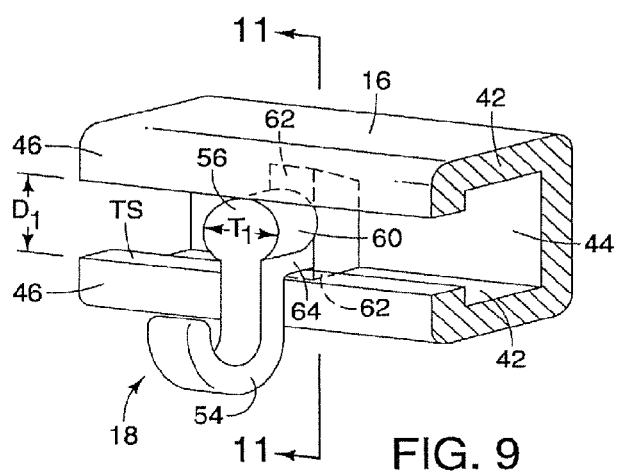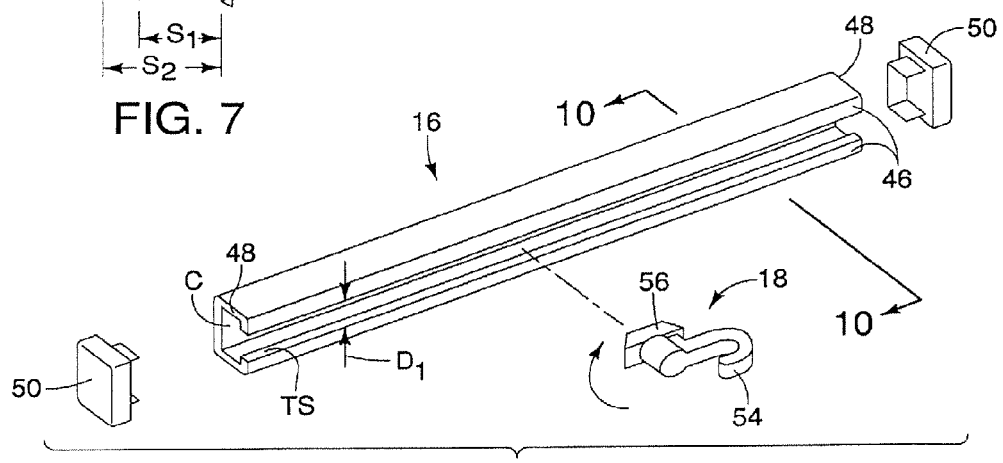
FIG. 7
FIG. 9
FIG. 8

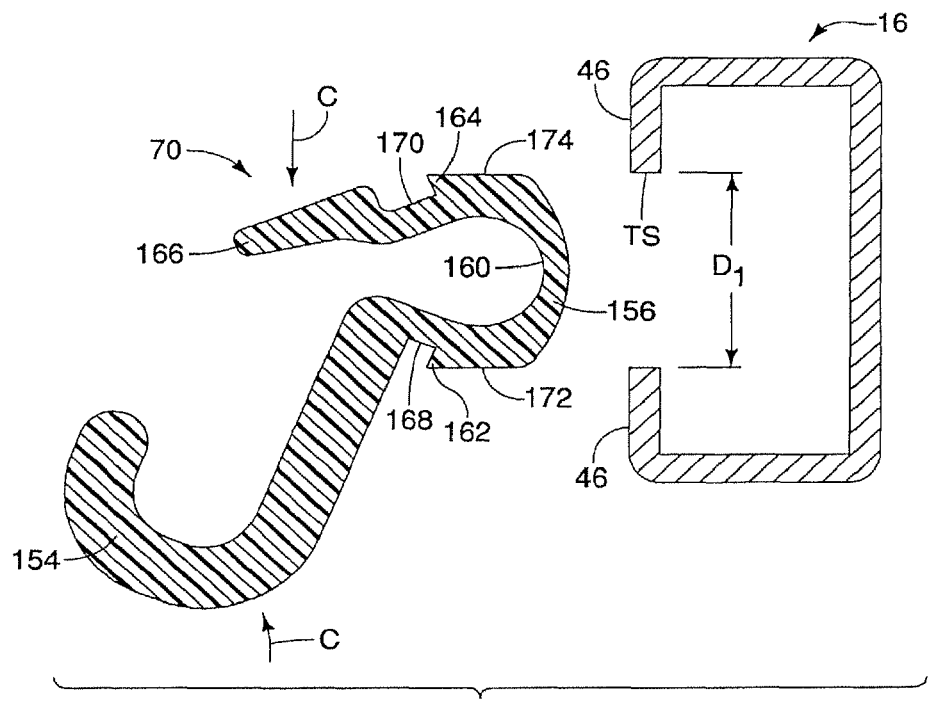
FIG. 13
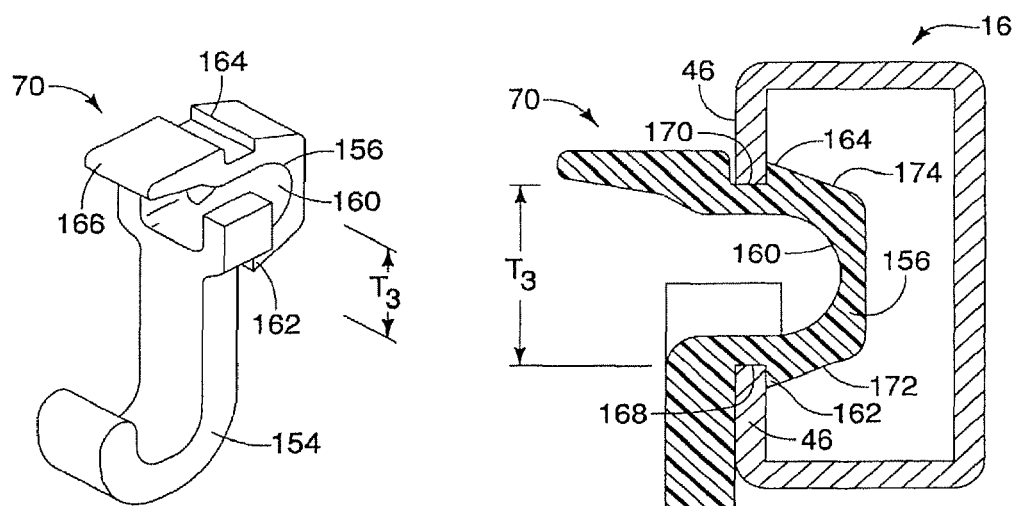
FIG. 12
FIG. 14

INTERIOR VEHICLE BODY STRUCTURE

CROSS-REFERENCE TO RELATED APPLICATIONS

This application is a division application of U.S. patent application Ser. No. 12/169,237 filed on Jul. 8, 2008. The entire disclosure of U.S. patent application Ser. No. 12/169,237 is hereby incorporated herein by reference.

BACKGROUND OF THE INVENTION

1. Field of the Invention

The present invention relates to an interior vehicle body structure. More specifically, the present invention relates to an interior vehicle body structure that includes a cargo support track configured to receive installable, removable and re-installable cargo supporting accessories.

2. Background Information

Recently, the exterior cargo space structures of vehicles, such as those of pickup trucks, have been improved to include tracks. Such tracks have increased the versatility of the cargo bed of pickup trucks in that cargo can be secured at any of a variety of locations along the tracks. Further, tool boxes can be more easily secured to such tracks without modification or damage to the cargo bed.

However, interior cargo space structures have not undergone such feature adding improvements.

In view of the above, it will be apparent to those skilled in the art from this disclosure that there exists a need for improved interior cargo space structures that improve the functionality of interior cargo spaces. This invention addresses this need in the art as well as other needs, which will become apparent to those skilled in the art from this disclosure.

SUMMARY OF THE INVENTION

One object of the present invention is to improve the usefulness and functionality of a vehicle's interior cargo/storage space.

In accordance with one aspect of the present invention, a vehicle body structure includes a vehicle interior cargo area having an interior wall, a track and a cargo accessory. The track is fixedly attached to the interior wall and the track includes a pair of parallel spaced apart wall portions defining a track slot therebetween. The cargo accessory includes a cargo supporting portion and an attachment portion. The attachment portion is configured and arranged to attach to the wall portions of the track retaining the cargo accessory in position with a snap-fit engagement arrangement.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7 is a cross-sectional view of the interior wall taken along the line 7-7 in FIG. 6, showing one of the plurality of tracks in accordance with the present invention;

FIG. 8 is an exploded perspective view of one of the plurality of tracks showing one of the accessories removed from the track in accordance with a first embodiment of the present invention;

FIG. 9 is another perspective view of the one of the plurality of tracks from a different angle showing the accessory installed to the track in accordance with the first embodiment of the present invention;

FIG. 12 is a perspective view of an accessory shown removed from the track in accordance with a second embodiment of the present invention;

FIG. 13 is a side cross-sectional view of the accessory and one of the plurality of tracks with the accessory compressed, elastically deformed and oriented for installation to the track in accordance with the second embodiment of the present invention;

FIG. 14 is another side cross-sectional view of the accessory installed to the track in accordance with the second embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
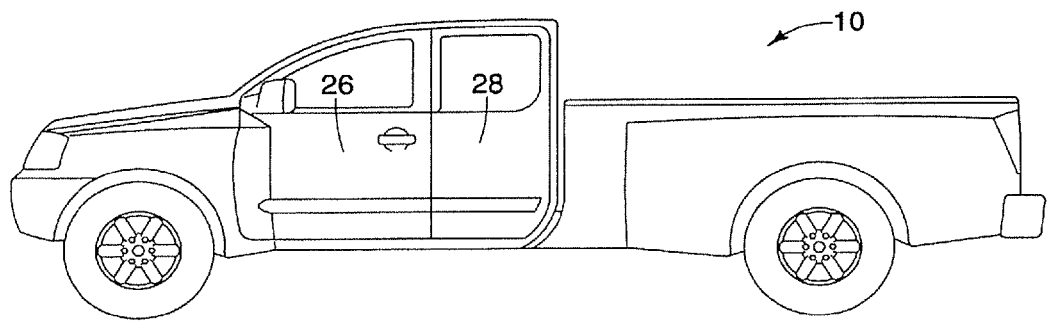
FIG. 1 is a side elevation of a vehicle that includes a cargo space structure in accordance with the present invention.
Figure 2:
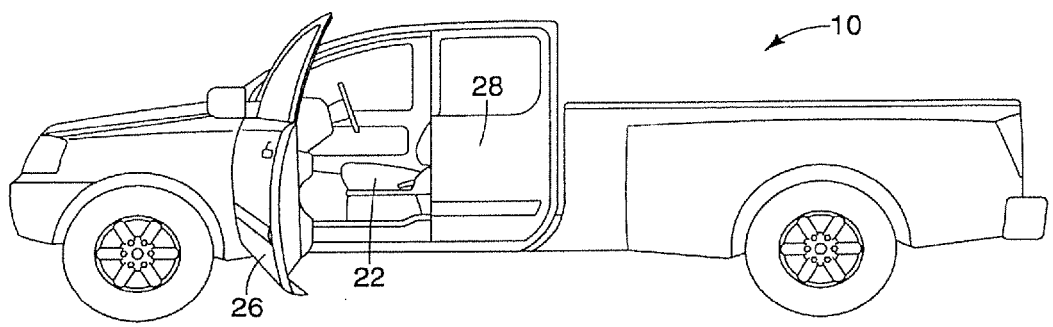
FIG. 2 is another side elevation of the vehicle similar to FIG. 1 showing a driver's side front door open and a rear access door closed concealing the cargo space structure in accordance with the present invention.
Figure 3:
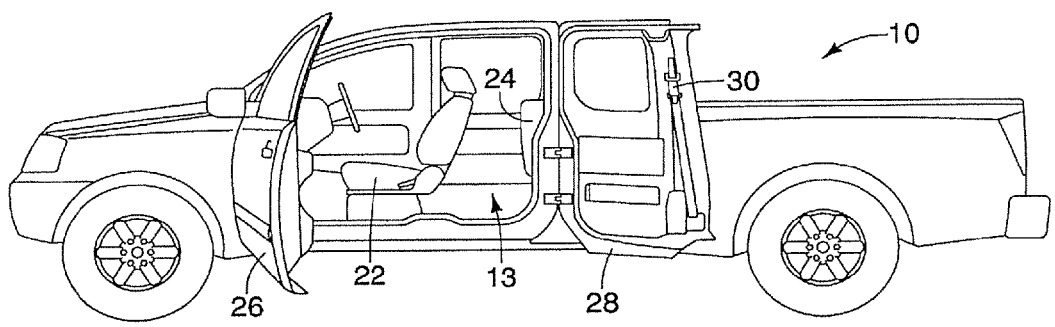
FIG. 3 is another side elevation of the vehicle similar to FIGS. 1 and 2 showing the driver's side front door open and the rear access door opened providing access to the cargo space structure in accordance with the present invention.
Figure 4:
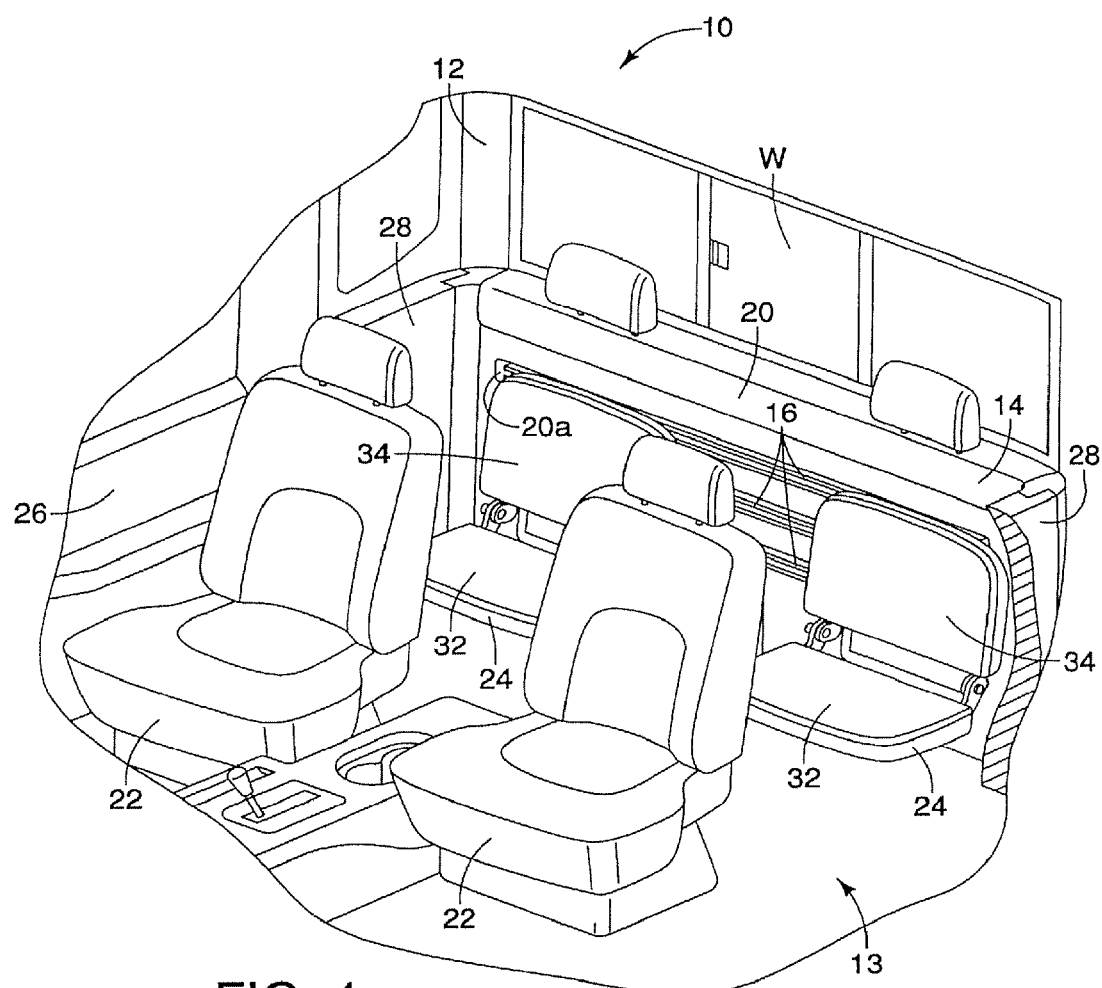
FIG. 4 is a perspective view of an interior portion of the vehicle showing front seats and rear seats of the vehicle with the rear seats partially concealing the cargo space structure in accordance with the present invention.
Figure 5:
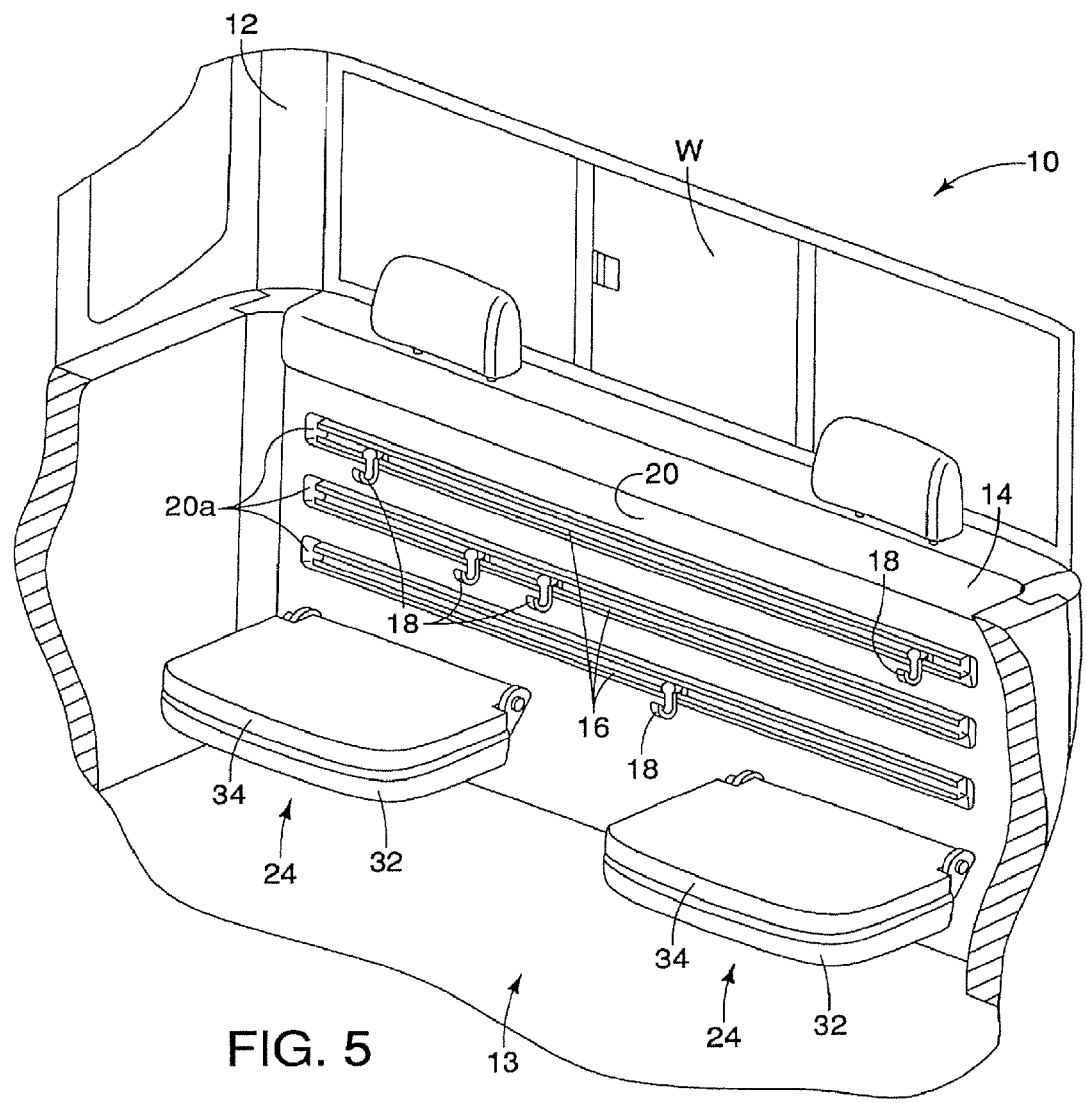
FIG. 5 is another perspective view of the interior portion of the vehicle with the front seats removed, the rear seats folded down to expose an interior wall of the cargo space structure, a plurality of tracks installed on the interior wall and accessories installed to the tracks in accordance with the present invention.
Figure 6:
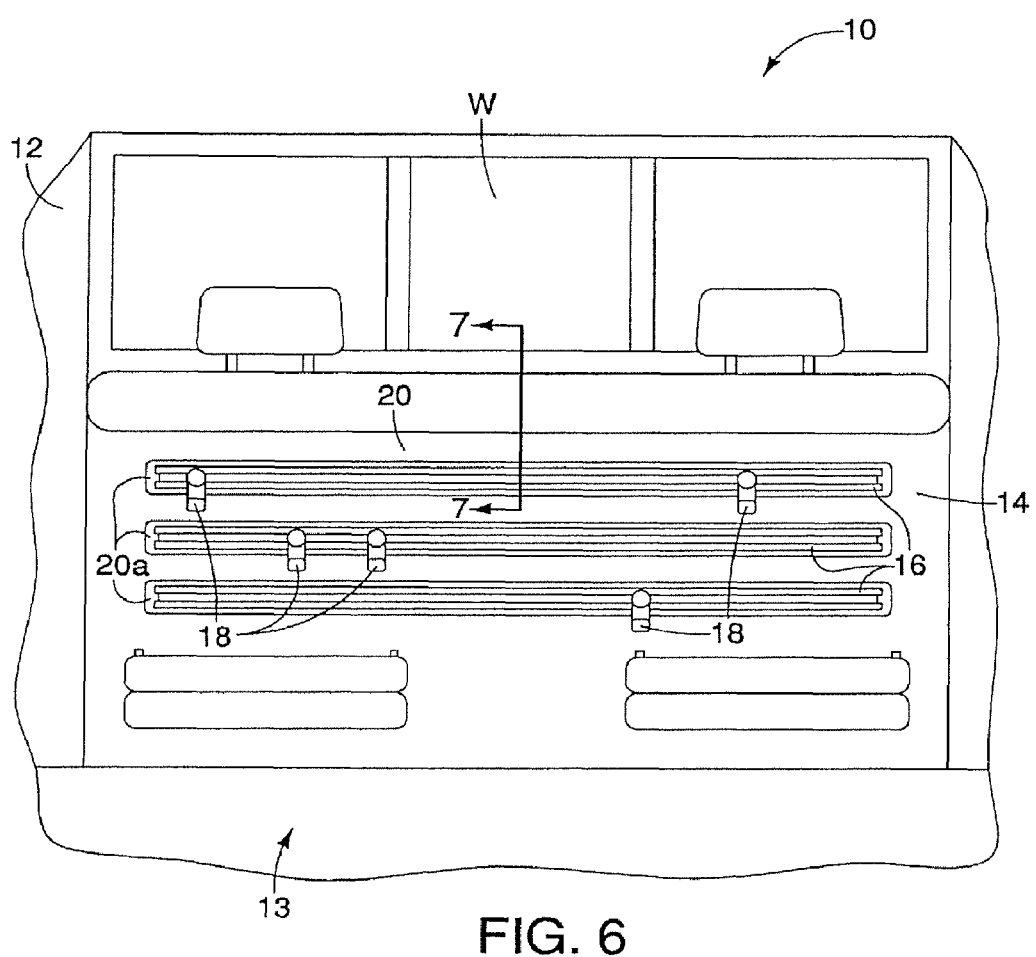
FIG. 6 is an elevation of the interior wall of the interior portion of the vehicle showing the rear seats folded down to expose the interior wall of the cargo space structure with the plurality of tracks and the accessories installed to the tracks in accordance with the present invention.

Referring initially to FIGS. 1, 2 and 3, a vehicle 10 is illustrated in accordance with the present invention. As best shown in FIGS. 4, 5 and 6, the vehicle 10 includes a vehicle body structure 12 that includes a vehicle interior area 13 with an interior wall 14 that includes a plurality of tracks 16 and a plurality of attachable, removable and re-attachable accessories, such as an accessory 18 that attach to tracks 16, as described in greater detail below.

In the depicted embodiments of the present invention, the interior wall 14 of the vehicle body structure 12 is the rear wall of the vehicle interior area 13. However, it should be understood from the drawings and the description herein that the interior wall 14 of the vehicle body structure 12 can be part of any interior space of a vehicle, such as an interior wall of a van, an interior wall of a semi-trailer/tractor, a wall of an enclosed cargo truck, or a wall of any other type of vehicle with an interior space capable of receiving and supporting cargo. As best shown in FIG. 7, the interior wall 14 includes a rigid and generally upright wall portion 19, an interior trim panel 20 and a window W. Both the wall portion 19 and the interior trim panel 20 extend at least partway and preferably all the way between opposite sides of the vehicle 10. Included in the vehicle interior area 13 are front seats 22, rear seats 24, front doors 26 and rear doors 28. The wall portion 19 and the interior trim panel 20 preferably extend between the rear doors 28. The interior trim panel 20 includes a plurality of elongated recesses 20a (only one shown in FIG. 7) each being dimensioned to receive a corresponding one of the tracks 16. As shown best in FIG. 7, surfaces 20b and 20c of the interior trim panel 20 adjacent to the recesses 20a are spaced apart from the wall portion 19 by a distance $S_1$.

The front seats 22 are conventional driver and front passenger seats. The rear seats 24 in the depicted embodiment are crew seats typically found in conventional King Cab style pick-up trucks. The rear seats 24 are supported on the interior wall 14 in a conventional manner. However, it should be understood from the description and drawings herein, that the vehicle 10 can be provided with full size rear seats or with no rear seats and still realize the advantages of the various aspects of the invention described below. Alternatively, the rear seats 24 can be replaced with a single fold-down bench style rear seat. In yet another alternative embodiment, the rear seat 24 can be a pair of bucket seats supported on the floor of the vehicle interior area 13.

The rear seats 24 each include a seating portion 32 and a seatback portion 34. The seating portion 32 can optionally be folded up (not shown) against the interior wall 14. The seatback portion 34 can be pivoted between an upright position (a track concealing position) covering, obscuring or hiding at least a portion of the interior wall 14 (FIG. 4) and a reclined position (a track exposing position) exposing the portion of the interior wall 14 (FIGS. 5 and 6). With the seatback portions 34 in the upright position, the tracks 16 are at least partially concealed below upper ends of the seatback portions 34. With the seatback portions 34 in the reclined position, the tracks 16 are exposed and are located above the reclined seatback portions 34.

With reference again to FIGS. 1, 2 and 3, the front doors 26 (only one shown) are conventional vehicle front doors that move between an open position depicted in FIGS. 2 and 3 and a closed position depicted in FIG. 1. The rear doors 28 are narrow doors that have hinges (not shown) disposed along a rear edge of the rear doors 28. Hence, the rear doors 28 pivot between a closed position shown in FIGS. 1 and 2, and an open position shown in FIG. 3. With both the front door 26 and the rear door 28 open, a large opening is revealed exposing the vehicle interior area 13.

As indicated in FIG. 3, the rear door 28 includes a B-pillar-like structure 30 that is fixed within the rear door 28. The B-pillar-like structure 30 includes a striker plate and corresponding hardware that ensures secure closing of both the rear door 28 and the front door 26. However, in the depicted embodiments, the front door 26 cannot be shut unless the rear door 28 is first shut. In other words, the rear door 28 must be closed before the front door 26 can be closed. Conversely, the rear door 28 cannot be opened with the front door 26 shut. In order to open the rear door 28 the front door 26 must first be opened.

As best shown in FIGS. 4-6, the vehicle body structure 12 and the interior wall 14 define the vehicle interior area 13. The interior wall 14 is provided with the window W and a plurality of the tracks 16 that are fixedly attached to the interior wall 14 below the window W within respective ones of the recesses 20a. As best shown in FIG. 7, each of the tracks 16 is fixed to the interior wall 14 by fasteners F, but can alternative be attached to the interior wall 14 by welding or can be molded into the structure of the interior wall 14. Since the tracks 16 are identical to one another, description of one applies to all.

As shown in FIG. 7, the track 16 is an elongated member that has a generally U-shaped configuration when viewed in cross-section. The U-shape of the track 16 defines a hollow interior or central channel 40 surrounded on three sides by parallel walls 42 and back wall 44. The parallel walls 42 further include a pair of parallel spaced apart wall portions 46 defining a track slot TS therebetween. The wall portions 46 extend from respective ones of the parallel walls 42 such that the track slot TS between the wall portions 46 exposes the hollow interior or central channel 40. Further, the wall portions 46 are spaced apart from one another by a first distance $D_1$. In other words, the track slot TS has a width corresponding to the first distance $D_1$. It should be understood that the track slot TS extends approximately the full length of the track 16 as indicated in FIG. 8. In the embodiment depicted in FIG. 7, the tracks 16 are fixed to the upright wall portion 19 by the fasteners F, such that the fasteners F extend from the central channel 40 (the hollow interior) of the track 16 through the back wall 44 of the track 16 and further through the interior trim panel 20 and the upright wall portion 19. The wall portions 46 of the accessory track 16 are spaced apart from the wall portion 19 of the interior wall 14 by a distance $S_2$. As shown in FIG. 7, the distance $S_2$ is greater than the distance $S_1$.

As best shown in FIG. 8, the track 16 includes open lateral ends 48 that are closed off by a pair of end caps 50. The end caps 50 are dimensioned and shaped to fit into respective ones of the open lateral ends 48 providing the track 16 with an attractive appearance and with closed ends.

As is indicated in FIGS. 1, 2, 4 and 5, the interior cargo area 13 is defined in part by the interior wall 14 is concealed by the rear door 28 when the rear door 28 is in the closed position.

A description of the accessory 18 in accordance with a first embodiment of the present invention is now provided with specific reference to FIGS. 8-11. The accessory 18 is a single unitary element that is attached to or installed to any one of the tracks 16 with an interference fit, as described below.

The accessory 18 is a cargo accessory that includes a cargo supporting portion 54 and an attachment portion 56 connected to one another in a non-threaded manner. More specifically, the cargo supporting portion 54 and the attachment portion 56 are integrally formed or molded integrally as a single unitary element. The accessory 18 can be made with a variety of materials. For example, the accessory 18 can be made entirely of molded polymer material(s) or of a metallic material. Alternatively, the accessory can have an inner core of rigid reinforcing material coated with a plastic or polymer material.

In the depicted embodiment, the cargo supporting portion 54 has a hook shape that resembles the letter J (a hook portion). The hook shape of the cargo supporting portion 54 extends away from the attachment portion 56 of the accessory 18. Alternatively, the cargo supporting portion 54 can have any of a variety of shapes and is not limited to the large J-shaped hook depicted in FIGS. 8, 9 and 11.

Figure 11:
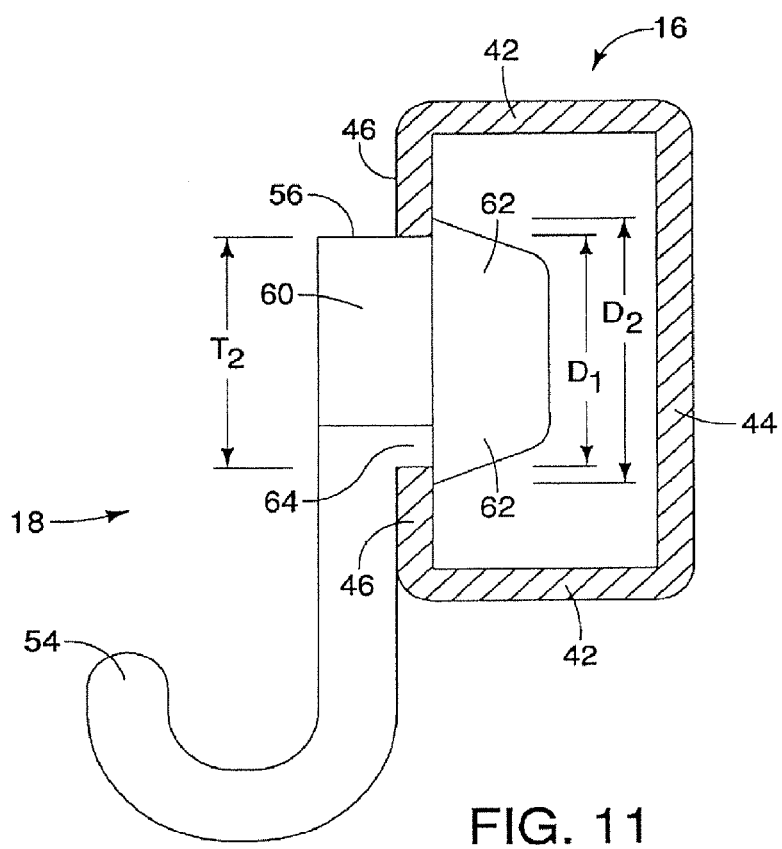
FIG. 11 is another side cross-sectional view of the one of the plurality of tracks taken along the line 11-11 in FIG. 9 showing the accessory installed to the track in accordance with the first embodiment of the present invention.
Figure 15:
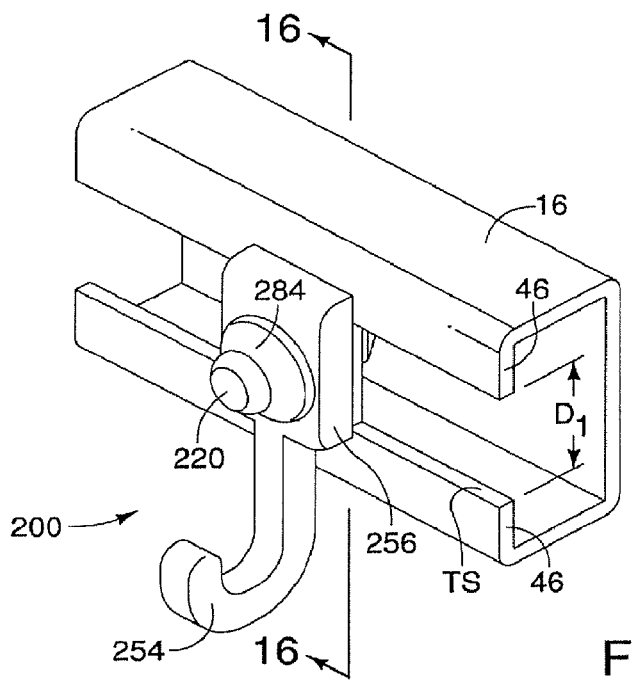
FIG. 15 is a perspective view of a mechanically operated accessory installed in one of the plurality of tracks in accordance with a third embodiment of the present invention.

As best shown in FIGS. 9 and 11, the attachment portion 56 includes a central body 60 with two projections 62. The central body 60 of the attachment portion 56 is rigidly attached to the cargo supporting portion 54 of the accessory 18. The projections 62 are formed on opposite sides of the central body 60. The projections 62 are configured to retain the accessory 18 to the spaced apart wall portions 46 of the track 16 with the central body 60 extending through the track slot TS between the spaced apart wall portions 46. The central body 60 has an overall cylindrical shape, as indicated in FIG. 9. However, the central body 60 also includes a shoulder portion 64 that extends downward from the central body 60 in FIGS. 9 and 11. The shoulder portion 64 has a rectangular-like shape.

Figure 10:
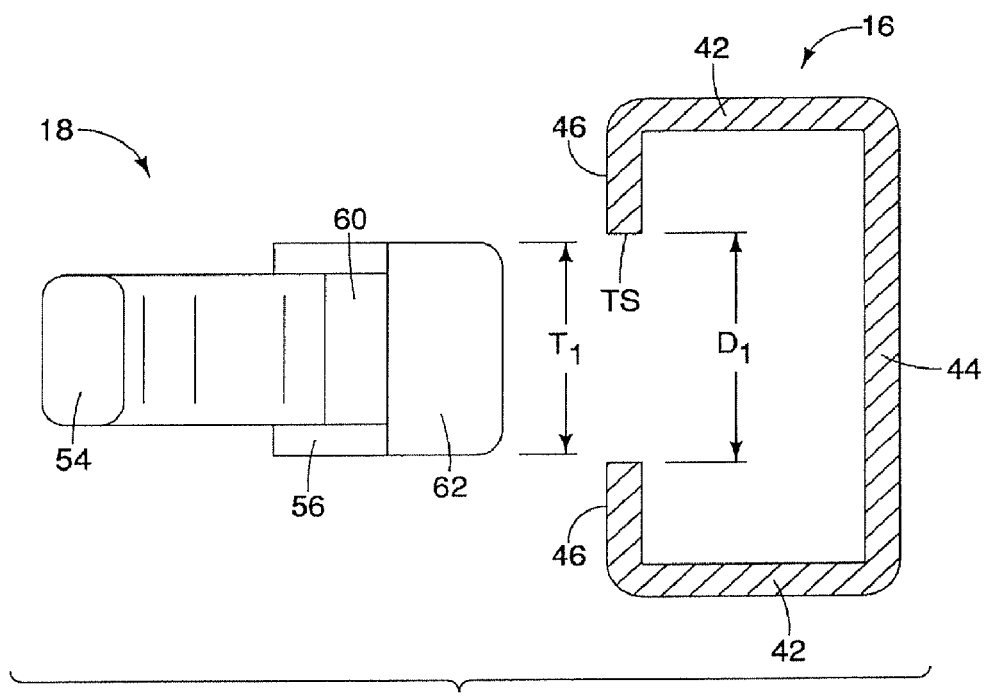
FIG. 10 is a side cross-sectional view of the one of the plurality of tracks taken along the line 10-10 in FIG. 8 showing the accessory oriented for installation to the track in accordance with the first embodiment of the present invention.

With reference to FIGS. 9, 10 and 11, the attachment portion 56 is dimensioned with a first thickness $T_1$ (FIG. 10) and a second thickness $T_2$ (FIG. 11) measured perpendicular to one another. The first thickness $T_1$ is a measurement of the central body 60 corresponding to an outer diameter of the cylindrical shape of the central body 60, as indicated in FIGS. 9 and 10. The second thickness $T_2$ is a measurement of the outer diameter of the cylindrical shape of the central body 60 plus the shoulder portion 64, as indicated in FIG. 11. The second thickness $T_2$ is greater than the first thickness $T_1$.

The first thickness $T_1$ of the central body 60 is less than or equal to the first distance $D_1$ between the spaced apart wall portions 46 (corresponding to the track slot TS). Consequently, the central body 60 is insertable between the spaced apart wall portions 46 of the track 16 with the central body 60 rotated to the orientation depicted in FIGS. 8 and 10. However, the second thickness $T_2$ is approximately the same or slightly larger than the first distance $D_1$ between the spaced apart wall portions 46 (corresponding to the track slot TS). Consequently, when the central body 60 is installed in the track 16 and rotated to the orientation depicted in FIGS. 9 and 11, the central body 60 and the shoulder portion 64 engage the spaced apart wall portions 46 with an interference fit.

The cargo supporting portion 54 is operable to attach the attachment portion 56 to the spaced apart wall portions 46 of the track 16. Specifically, as indicated in FIGS. 8 and 10, with the cargo supporting portion 54 of the accessory 18 oriented (rotated) in a direction extending parallel to the spaced apart wall portions 46, the central body 60 of the attachment portion 56 is insertable into the track slot TS between the spaced apart wall portions 46. Once attachment portion 56 is inserted into the track 16, the cargo supporting portion 54 can be used as a lever to rotate the accessory 18 ninety (90) degrees to the orientation shown in FIGS. 9 and 11 (non-parallel or perpendicular to the spaced apart wall portions 46). The act of rotating the accessory 18 to the orientation depicted in FIGS. 9 and 11 causes the central body 60 and the shoulder portion 64 to engage opposite ones of the spaced apart wall portions 46. Since the thickness $T_2$ of the shoulder portion 64 and the central body 60 is the same or slightly greater than the distance $D_1$ between the spaced apart wall portions 46, the shoulder portion 64 and the central body 60 are slightly compressed establishing an interference fit. Hence, the accessory 18 can be installed to the track 16 and retained in position in a tool-less manner.

The projections 62 of the attachment portion 56 extend outward away from the central body 60 of the attachment portion 56 a second distance $D_2$. As indicated in FIG. 11, the second distance $D_2$ is greater than the first distance $D_1$ and also greater than the thickness $T_2$ of the central body 60 and the shoulder portion 64. Consequently, once the accessory 18 is installed in the track 16, the projections 62 prevent the accessory 18 from being pulled out of the track 16 and the interference fit between the central body 60 and the spaced apart wall portions 46 prevents rotation and removal of the accessory 18. It should be understood that sufficient rotational force applied to the cargo supporting portion 54 will cause the central body 60 to rotate, allowing removal of the accessory 18 from the track 16. However, during use of the accessory 18 to support cargo hanging therefrom, the interference fit between the central body 60 of the attachment portion 56 and the track 16 is sufficient to retain the accessory 18 to the track 16.

Hence, the accessory 18 is configured such that with cargo supporting portion 54 oriented in a direction extending parallel to the spaced apart wall portions 46 of the track 16, the central body 60 of the attachment portion is removable and insertable into the track slot TS between the spaced apart wall portions 46. Further, with the cargo support portion 54 oriented in a direction extending non-parallel to the spaced apart wall portions 46, the projections 62 interfere with insertion and removal of the central body 60 in and out of the track slot TS between the spaced apart wall portions 42 of the track 16.

As shown best in FIG. 6, a plurality of the accessories 18 can be installed to the plurality of tracks 16. Consequently a variety of tools, cargo and/or equipment can be stored on the hook portion of the accessories 18. Further, tool boxes (not shown) or special equipment can be installed to the interior wall 14 by hanging such special equipment to one or more of the accessories 18. The accessories 18 provide a flexible arrangement for the storage of equipment (not shown) and/or cargo (not shown) within an enclosed area of the vehicle 10.

Second Embodiment

Referring now to FIGS. 12, 13 and 14, an accessory 70 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The accessory 70 is utilized in a manner that is generally the same as the accessory 18. Specifically, the accessory 70 can be easily installed to any one of the plurality of tracks 16 (only one track 16 is depicted in FIGS. 13 and 14) of the vehicle 10. In the second embodiment, the vehicle 10 is the same vehicle described above with respect to the first embodiment. Further, the track 16 is the same as in the first embodiment described above.

It should further be understood from the drawings and description herein that the accessory 70 and the accessory 18 can both be used interchangeably and simultaneously on a single track 16.

The accessory 70 is a single unitary element that is attached to or installed to any one of the tracks 16 with what can be considered as both a snap-fit and interference fit, as described below.

The accessory 70 is a cargo accessory that includes a cargo supporting portion 154 and an attachment portion 156 connected to one another in a non-threaded manner. More specifically, the cargo supporting portion 154 and the attachment portion 156 are integrally formed or molded integrally as a single unitary element. The accessory 70 can be made with a variety of materials, as long as the materials have a prescribed amount of flexibility and resiliency. For example, the accessory 70 can be made entirely of molded polymer material(s) or of a metallic material. Alternatively, the accessory can have an inner core of resilient reinforcing material coated with a plastic or polymer material. For example, the inner core can be a resilient metallic material coated with plastic or polymer material(s).

In the depicted embodiment, the cargo supporting portion 154 has a hook shape that resembles the letter J (a hook portion). The hook shape of the cargo supporting portion 154 is preferably dimensioned to be more rigid that the attachment portion 156. For example, the cargo supporting portion 154 is depicted as being thicker than the attachment portion 156 and is therefore less resilient than the attachment portion 156. Alternatively, the cargo supporting portion 154 can have any of a variety of shapes and is not limited to the large J-shaped hook depicted in FIGS. 12, 13 and 14. As shown in the drawings, the cargo supporting portion 154 extends away from the attachment portion 156 of the accessory 70.

The attachment portion 156 has a central body 160 with two projections 162 and 164. The projections 162 and 164 are formed on opposite sides of the central body 160, with the projection 162 being located adjacent to the cargo supporting portion 154 and the projection 164 being located near a distal end 166 of the central body 160. The projections 162 and 164 are dimensioned to retain the accessory 70 to the spaced apart wall portions 46 of the track 16 with the central body 160 extending through the track slot TS between the spaced apart wall portions 46.

The central body 160 has a U-shape when viewed in cross-section, as indicated in FIGS. 13 and 14. With reference to the orientation of the accessory 70 in FIGS. 12-14, a lower end of the U-shape of the central body 160 extends from the cargo supporting portion 154 and the distal end 166 (an upper end) is spaced apart from the cargo supporting portion 154. The central body 160 further includes a pair of recesses 168 and 170. The recess 168 is located adjacent to the projections 162.

The recess 170 is located adjacent to the projection 164, between the projection 164 and the distal end 166 of the central body 160. The recesses 168 and 170 are dimensioned to receive respective ones of the spaced apart wall portions 46. The projection 162 includes a tapered surface 172 and the projection 164 further includes a tapered surface 174, as indicated in FIGS. 13 and 14.

The central body 160 with its overall U-shape, is preferably flexible and resilient, such that compressive force C applied to the distal end 166 and to the cargo supporting portion 154 causes elastic deformation of the U-shape of the central body 160, as indicated in FIG. 13. However, upon the release of the compressive force C, the central body 160 returns to its original shape, as shown in FIGS. 12 and 14.

In a non-compressed state as shown in FIG. 12, the attachment portion 156 preferably is dimensioned such that a distance measured between the recesses 168 and 170 is at least a third thickness $T_3$. The third thickness $T_3$ is preferably greater than the first distance $D_1$ between the spaced apart wall portions 46 (corresponding to the track slot TS). Consequently, when the central body 160 is insertable between the spaced apart wall portions 46 of the track 16 the resiliency of the U-shape of the central body 160 retains the accessory 70 to the track 16.

It should be understood from the drawings and the description herein that the accessory 70 can be installed to the track 16 in either one of two ways. First, compressive force C can be applied to the distal end 166 and to the cargo supporting portion 154 causing the elastic deformation of the U-shape of the central body 160, as indicated in FIG. 13. In the elastically deformed state depicted in FIG. 13, the central body 160 can easily be inserted into the track slot TS of the track 16. Once the compressive force C is removed, the resiliency of the central body 160 provides a biasing force that urges the recesses 168 and 170 into contact with the spaced apart wall portions 46 establishing an interference fit therebetween Further, the projections 162 and 164 prevent the central body 160 from being removed from the track 16 in the absence of the compressive force C because the projections 162 and 164 of the attachment portion 156 are biased by the U-shape of the central body 160 to extend outward.

Secondly, the central body 160 can be pushed without compressive force into the track slot TS of the track 16. Specifically, if the central body 160 is pushed with sufficient force, the tapered surfaces 172 and 174 engage the edges of the spaced apart wall portion 46 of the track thereby compressing the central body 160. After sufficient force has been applied to the central body 160, the recesses 168 and 170 mate with the spaced apart wall portion 46 to achieve a snap-fit engagement with the track 16.

Consequently, the accessory 70 can be attached to the spaced apart wall portions 46 of the track 16 retaining the accessory 70 in position in a tool-less manner. The attachment portion 156 is configured and arranged to attach to the spaced apart wall portions 46 of the track 16 with projections 162 and 164 extending outwardly therefrom retaining the accessory 70 in position with a snap-fit engagement arrangement. Further, as shown in FIG. 14, the projections 162 and 164 of the attachment portion 156 extend outward from the central body 150 a distance that is greater than the first distance $D_1$ between the spaced apart wall portions 46 of the track 16.

Third Embodiment

Referring now to FIGS. 15-22, an accessory 200 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The accessory 200 is a mechanically operated accessory that is utilized in a manner that is generally the same as the accessory 18 and the accessory 70. Specifically, the accessory 200 is easily installed to any one of the plurality of tracks 16 (only one track 16 is depicted in FIGS. 15-18) of the vehicle 10. In the third embodiment, the vehicle 10 is the same vehicle described above with respect to the first embodiment. Further, the track 16 is the same as in the first embodiment described above.

The accessory 200 includes a cam operated mechanism 220 that allows for a snap-fit engagement with the track 16, as described in greater detail below. The accessory 200 also includes a cargo supporting portion 254 and an attachment portion 256 that are rigidly connected to one another. The cargo supporting portion 254 which supports a portion of the cam operated mechanism 220 is operable to attach the attachment portion 256 to the spaced apart wall portions 46 of the track 16 retaining the accessory 200 in position in a tool-less manner. The cargo supporting portion 254 includes a hook portion that extends away from the attachment portion 256 of the accessory 200.

Figure 21:
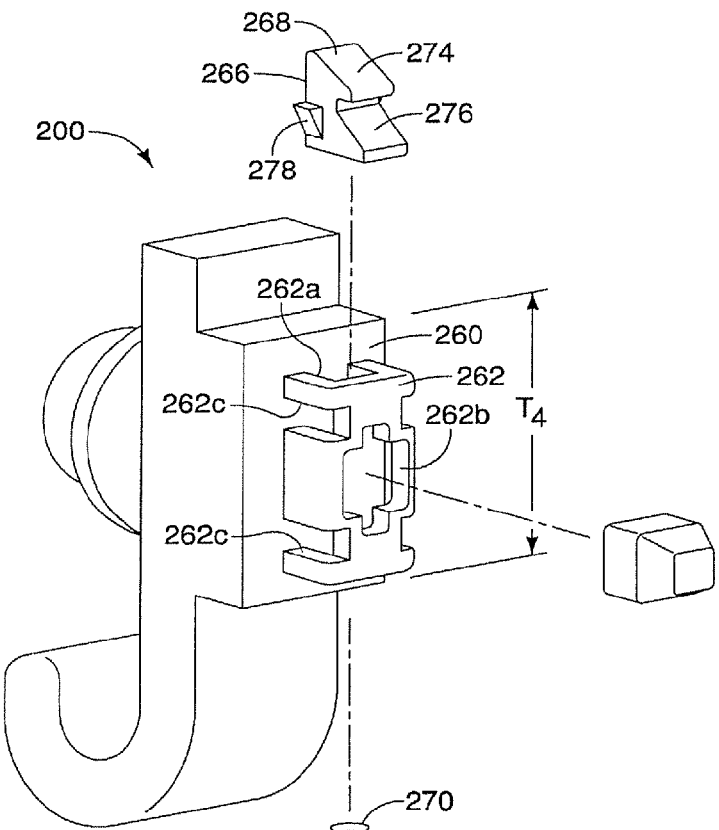
FIG. 21 an exploded perspective view of a backside of the accessory showing the cam member and projections that include cam surfaces that are contacted by the cam member in accordance with the third embodiment of the present invention.

A portion of the cam operated mechanism 220 is located in the cargo supporting portion 254 and a portion of the cam operated mechanism 220 is located in the attachment portion 256, as described further below. As best shown in FIG. 21, the attachment portion 256 includes a central body 260, a housing 262 extending from the central body 260, a central aperture 264 (shown in FIGS. 16-18) and movable latching members 266 that include projections 268 that extend outward therefrom. The movable latching members 266 and the projections 268 are configured to snap-fit to the track 16. The movable latching members 266 (and projections 268) are biased to extend outward from the housing 262 and the central body 260 and are configured to retain the accessory 200 to spaced apart wall portions 46 of the track 16 with the central body 260 extending into the track slot TS between the spaced apart wall portions 46.

The central body 260 of the attachment portion 256 has a fourth thickness $T_4$ that is less than or equal to the first distance $D_1$ between the spaced apart wall portions 46 (the track slot TS) of the track 16 such that the central body 260 is insertable in the track slot TS between the spaced apart wall portions 46 of the track 16. The projections 268 of the movable latching members 266 are biased by a spring 270 to extend outward from the central body 260 a fifth distance $D_5$ (FIG. 16) greater than the first distance $D_1$ between the spaced apart wall portions 46 of the track 16.

Figure 16:
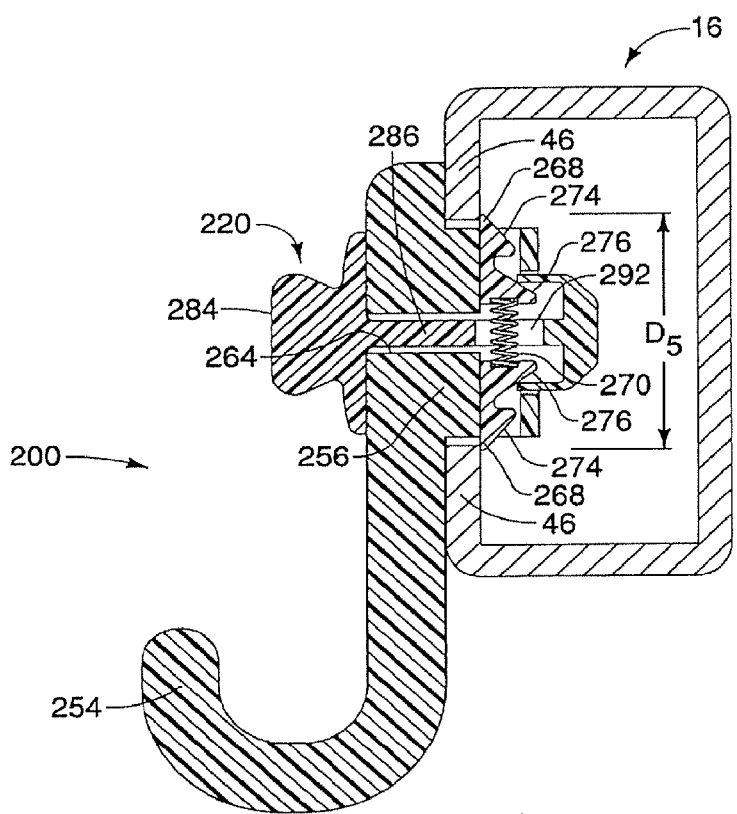
FIG. 16 is a side cross-sectional view of the accessory and the track taken along the line 16-16 in FIG. 15, showing the accessory installed to the track and further showing features of a cam mechanism of the accessory, in accordance with the third embodiment of the present invention.
Figure 17:
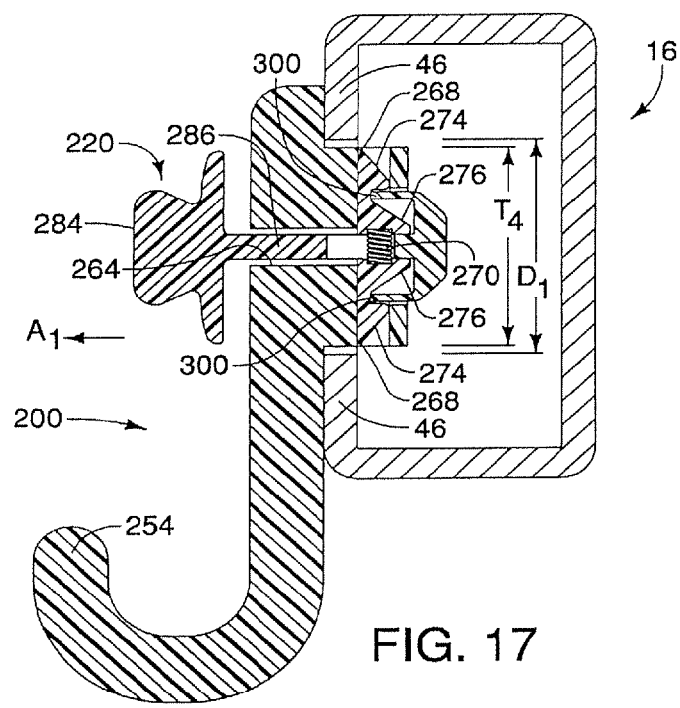
FIG. 17 is another side cross-sectional view of the accessory and the track showing the cam mechanism in an accessory releasing position allowing the accessory to be removed from the track in accordance with the third embodiment of the present invention.
Figure 18:
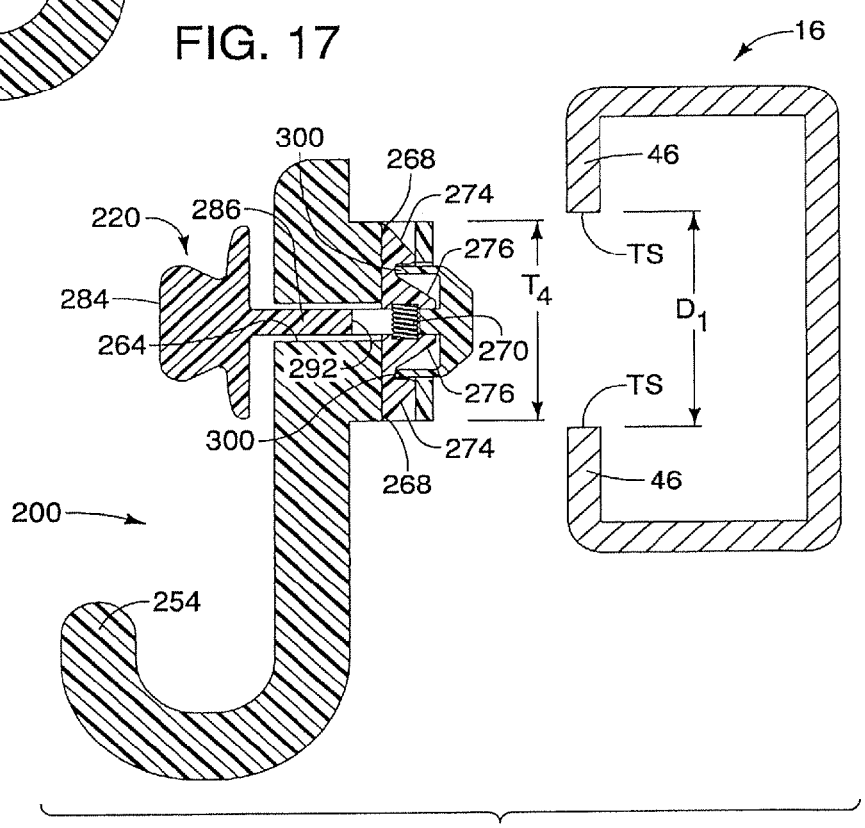
FIG. 18 is another side cross-sectional view of the accessory and the track showing the cam mechanism in the accessory releasing position removed from the track in accordance with the third embodiment of the present invention.

The housing 262 can be integrally formed with the attachment portion 256 or can be removable fixed thereto by fasteners (not shown). The housing 262 includes latch openings 262a, a cam opening 262b and retainer openings 262c, as shown in FIG. 21. The central aperture 264 extends through the attachment portion 256 and is exposed on an outer surface of the cargo supporting portion 254 as indicated in FIGS. 16-18.

Figure 22:
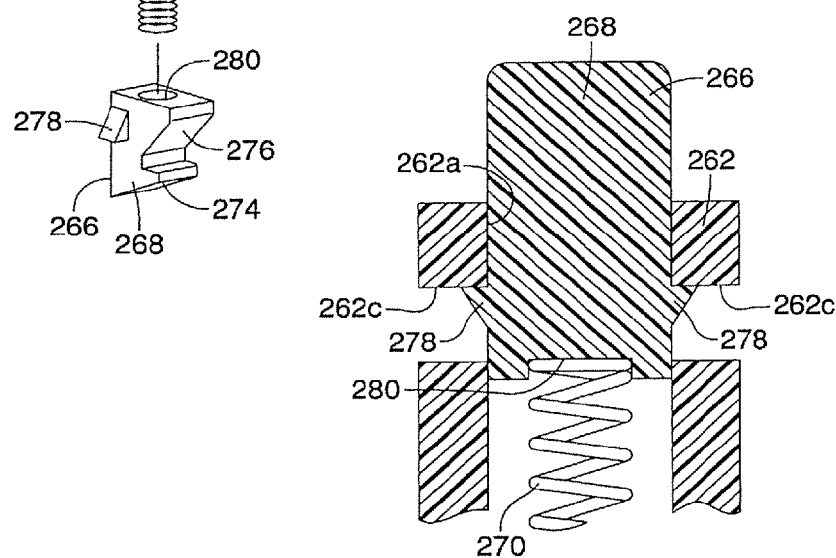
FIG. 22 is a cross-sectional view of a portion of the backside of the accessory in accordance with the third embodiment of the present invention.

A description of the movable latching members 266 is now provided with specific reference to FIGS. 21 and 22. There are two movable latching members 266 retained within the housing 262 of the attachment portion 256 of the accessory 200 such that the projections 268 extend through the latch openings 262a of the housing 262, as shown in FIG. 22. The movable latching members 266 are identical and therefore description of one applies to both. For the sake of brevity, only one of the movable latching members 266 is described.

The movable latching member 266 includes a tapered surface 274, a cam surface 276, retaining projections 278, a spring contacting surface 280 and the projections 268. The tapered surface 274 is formed on the projection 268 and is dimensioned and shaped such that the accessory 200 can be snap-fitted into the track 16. Specifically, when the accessory 200 is brought up against the track 16 with the central body 260 aligned with the track slot TS of the track 16, a prescribed amount of pressure applied to the cargo supporting portion 254 causes the tapered surfaces 274 to engage respective edges of the spaced apart wall portion 46. Continued pressure causes the movable latching members 266 to be moved inward compressing the spring 270. Once the movable latching members 266 have moved in a sufficient distance, the central body 260 can move into the track slot TS. Once the movable latching members 266 have moved into the central channel 40 of the track 16, the spring 270 urges the movable latching members 266 outward and the accessory 200 is attached to the track 16.

The cam surfaces 276 of the movable latching members 266 are configured to interact with operation of the cam operated mechanism 220, as described in greater detail below.

The retaining projections 278 are dimensioned and positioned to limit outward movement of the movable latching members 266 with the movable latching members 266 installed within the housing 262 of the attachment portion 256. Specifically, the retaining projections 278 extend into the retainer openings 262c of the housing 262, as shown in FIG. 22. The spring contacting surface 280 includes a recess that retains one end of the spring 270, as shown in FIG. 22.

The cam operated mechanism 220 is now described with specific reference to FIGS. 16-20. The cam operated mechanism 220 includes an outer handle 284, a shaft portion 286, and a cam member 288. The outer handle 284 and the shaft portion 286 are depicted as a single unitary element. However, the outer handle 284 and the shaft portion 286 can be made as separate elements fixed to one another. The outer handle 284 and the shaft portion 286 can be made of any of a variety of materials, such as metal materials, plastic materials or polymer materials.

The shaft portion 286 movably extends through the central aperture 264 of the attachment portion 256 such that the outer handle 284 is disposed at an upper region of the cargo supporting portion 254. A distal end of the shaft portion 286 includes a pair of fixing protrusions 290 that are dimensioned to fix the shaft portion 286 to the cam member 288, as described below. A recess 292 is formed in the shaft portion 286 extending from the fixing protrusions 290 part way toward the outer handle 284. The recess 292 is dimensioned to receive the spring 270 without interfering with the biasing function of the spring 270.

Figure 19:
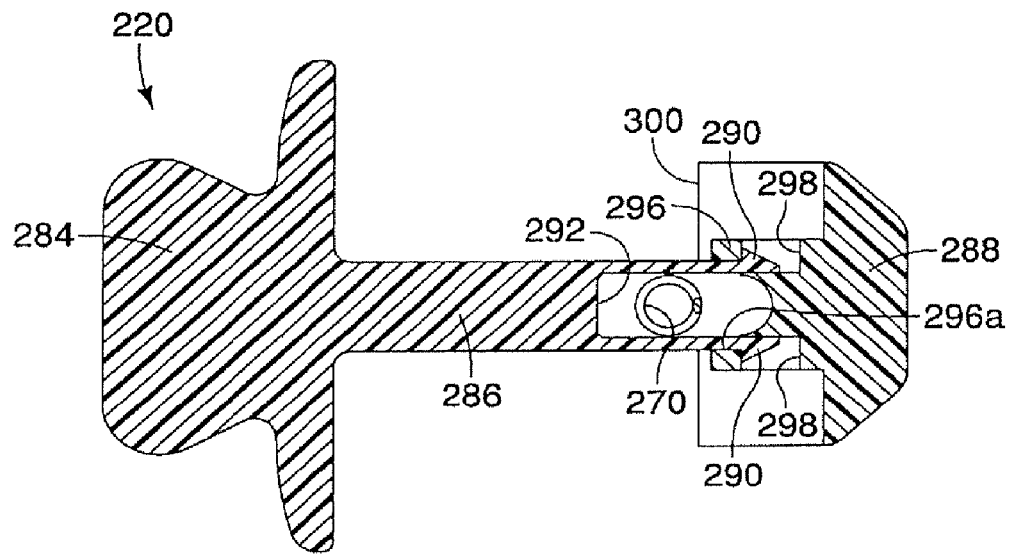
FIG. 19 is a cross-sectional view of a portion of the cam mechanism shown removed from the accessory and rotated 90 degrees relative to the depiction in FIGS. 16-18 in accordance with the third embodiment of the present invention.
Figure 20:
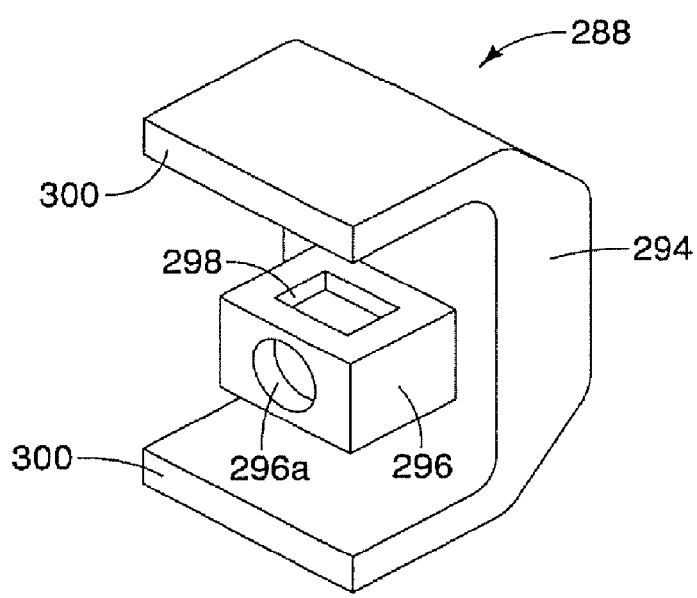
FIG. 20 is a perspective view of a cam member of the cam mechanism shown removed from the cam mechanism in accordance with the third embodiment of the present invention.

As best shown in FIG. 20, the cam member 288 includes a U-shaped base portion 294 and a shaft retaining portion 296 with a shaft aperture 296a and apertures 298. The base portion 294 includes a pair of spaced apart cam surfaces 300 located at distal ends of the U-shape of the base portion 294. The cam surfaces 300 are configured and dimensioned to engage the cam surfaces 276 of the movable latching members 266, as indicated in FIGS. 16-18. As shown in FIG. 19, the shaft aperture 296a is dimensioned to receive the shaft portion 286 and the apertures 298 of the shaft retaining portion 296 are configured to receive the fixing protrusions 290 of the shaft portion 286 of the cam operated mechanism 220. A spring (not shown) can optionally be provided on the shaft portion 286 to bias the cam operated mechanism 220 toward the position shown in FIG. 16. However such a spring is not necessarily required since the spring 270 biasing the movable latching members 266 also applies a biasing force to the cam operated mechanism 220 via the cam surfaces 274 of the movable latching members 266 to bias the cam operated mechanism 220 toward the position shown in FIG. 16.

Hence, as shown in FIGS. 16-22, the projections 268 of the movable latching members 266 of the attachment portion 256 include the cam surfaces 276. Further, the movable latching members 266 and the projections 268 are biased to extend outward away from the central body 260.

As shown in FIG. 16, the cargo supporting portion 254 includes and supports the cam operated mechanism 220. Further, the cam operated mechanism 220 (a cam engaging member) extends from an exposed portion of the cargo supporting portion 254 of the accessory 200 through the central aperture 264 in the central body 260 of the attachment portion 256.

The cam operated mechanism 220 includes the cam member 288 (a cam engaging member) that is configured to engage the cam surfaces 276 of the movable latching members 266. As indicated in FIGS. 16, 17 and 18, the relative movement of the cam operated mechanism 220 causes movement of the movable latching members 266. As shown in FIG. 17, movement of the cam operated mechanism 220 in a first direction $A_1$ (toward the left side of FIG. 17) moves the movable latching members 266 and the projections 268 inward toward the central body 260 of the attachment portion 256. In the position shown in FIG. 17, the accessory 200 can be either moved into position to attach the accessory 200 to the track 16 or the accessory 200 can be removed from the track 16, as shown in FIG. 18.

There are various components and features of the vehicle 10 that are conventional components that are well known in the art. Since such components and features of the vehicle 10 are well known in the art, these structures will not be discussed or illustrated in detail herein.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure comprising:
a vehicle interior area including an interior wall;
a track fixedly attached to the interior wall, the track including a pair of parallel spaced apart wall portions defining a track slot therebetween; and
a cargo accessory including a cargo supporting portion and an attachment portion, the attachment portion being configured and arranged to attach to the wall portions of the track retaining the cargo accessory in position with a snap-fit engagement arrangement.

2. The vehicle body structure according to claim 1, wherein the attachment portion includes a central body with projections that extend outward therefrom, the projections being configured to snap-fit the cargo accessory to the track.

3. The vehicle body structure according to claim 1, wherein the projections of the attachment portion extend outward from the central body of the attachment portion a first distance and the wall portions of the track are spaced apart from one another by a second distance with the first distance being greater than the second distance.

4. The vehicle body structure according to claim 1, wherein the projections of the attachment portion are biased to extend outward away from the central body of the attachment portion of the cargo accessory.

5. The vehicle body structure according to claim 3, wherein the projections of the attachment portion include cam surfaces, and
the cargo supporting portion includes a cam engaging member configured to engage the cam surface such that movement of the cam engaging member in a first direction moves the projections inward toward the central body of the attachment portion.

6. The vehicle body structure according to claim 5, wherein the cam engaging member extends from an exposed portion of the cargo supporting portion of the cargo accessory through an aperture formed in the central body of the attachment portion.

7. The vehicle body structure according to claim 1, wherein the central body of the attachment portion includes a flexible U-shaped portion with the projections extending from opposite lateral sides thereof, the flexible U-shaped portion biasing the projections away from one another.

8. The vehicle body structure according to claim 1, wherein the cargo supporting portion includes a hook portion that extends away from the attachment portion of the cargo accessory.

9. The vehicle body structure according to claim 1, wherein
the track is an elongated member with a hollow interior surrounded on three sides by a back wall and a pair of parallel walls, with the wall portions extending from respective ones of the parallel walls such that the track slot between the wall portions exposes the hollow interior.

10. The vehicle body structure according to claim 9, wherein
at least one open lateral end of the track is covered by an end cap.

11. The vehicle body structure according to claim 1, wherein
the interior cargo area is concealed by a vehicle door.

12. The vehicle body structure according to claim 1, wherein
the track is fixed to the interior wall by at least one fastener that extends from the hollow interior of the track through the back wall of the track, through the interior trim panel and the interior wall.

13. The vehicle body structure according to claim 9, wherein
the track is fixed to the interior wall by at least one fastener that extends from the hollow interior through the back wall to the interior wall.

14. The vehicle body structure according to claim 1, wherein
the interior wall includes:
a rigid generally upright wall portion; and
an interior trim panel covering at least a portion of the upright wall portion with the track being fixed to the upright wall portion.

15. The vehicle body structure according to claim 14, wherein
the interior wall further includes a rear window with the upright wall portion extending below the rear window.

16. The vehicle body structure according to claim 14, wherein
the track is an elongated member with a hollow interior surrounded on three sides by a back wall and a pair of parallel walls, with the wall portions extending from respective ones of the parallel walls such that the track slot between the wall portions exposes the hollow interior.

17. The vehicle body structure according to claim 16, wherein
the interior trim panel includes a horizontally extending recess with the track being installed in the horizontally extending recess.

18. The vehicle body structure according to claim 16, wherein
portions of the interior trim panel at upper and lower sides of the horizontally extending recess are spaced apart from upright wall portion by a first distance and the wall portions with the track slot therebetween are disposed a second distance from the upright wall portion with the second distance being greater than the first distance.

19. The vehicle body structure according to claim 1, wherein
the vehicle interior area includes a seatback movable between a track concealing position and a track exposing position, such that with the seatback in the track exposing position, a horizontal plane that is both normal to the interior wall and that intersects the track does not intersect the seatback.

* * * * *